(12) United States Patent
Malkamäki et al.

(10) Patent No.: US 8,578,231 B2
(45) Date of Patent: *Nov. 5, 2013

(54) REDUNDANCY STRATEGY SELECTION SCHEME

(75) Inventors: Esa Malkamäki, Espoo (FI); Frank Frederiksen, Klarup (DK)

(73) Assignee: Nokia Corporation, Espoo (FI)

( * ) Notice: Subject to any disclaimer, the term of this patent is extended or adjusted under 35 U.S.C. 154(b) by 414 days.

This patent is subject to a terminal disclaimer.

(21) Appl. No.: 13/044,015

(22) Filed: Mar. 9, 2011

(65) Prior Publication Data

US 2011/0161766 A1 Jun. 30, 2011

Related U.S. Application Data

(63) Continuation of application No. 10/732,745, filed on Dec. 11, 2003, now Pat. No. 7,925,953.

(30) Foreign Application Priority Data

Oct. 7, 2003 (EP) .................................... 03022457

(51) Int. Cl.
*G08C 25/02* (2006.01)
*H04L 1/18* (2006.01)

(52) U.S. Cl.
USPC ........................... 714/748; 714/786; 714/790

(58) Field of Classification Search
USPC ........................................ 714/748, 786, 790
See application file for complete search history.

(56) References Cited

U.S. PATENT DOCUMENTS

| | | | |
|---|---|---|---|
| 6,798,846 B2 | 9/2004 | Golitschek Edler Von Elbwart et al. | |
| 6,892,341 B2 | 5/2005 | Golitschek et al. | |
| 6,892,342 B2 | 5/2005 | Eroz et al. | |
| 7,000,173 B2 * | 2/2006 | Buckley et al. | ............... 714/790 |
| 7,093,184 B2 | 8/2006 | Kim et al. | |
| 7,111,219 B2 | 9/2006 | Golitschek et al. | |
| 2003/0079170 A1 | 4/2003 | Stewart et al. | |
| 2003/0133497 A1 | 7/2003 | Kinjo et al. | |
| 2003/0159100 A1 | 8/2003 | Buckley et al. | |
| 2003/0227875 A1 | 12/2003 | Wei et al. | |
| 2004/0228320 A1 | 11/2004 | Laroia et al. | |
| 2005/0163040 A1 | 7/2005 | Wengerter et al. | |
| 2005/0163161 A1 | 7/2005 | Wei et al. | |
| 2005/0220040 A1 | 10/2005 | Petrovic et al. | |
| 2006/0092972 A1 | 5/2006 | Petrovic et al. | |
| 2006/0251185 A1 | 11/2006 | Von Elbwart et al. | |

OTHER PUBLICATIONS

Chinese Office Action, Application No. CN200480029254.0, Dated Dec. 5, 2012.

(Continued)

*Primary Examiner* — Sam Rizk
(74) *Attorney, Agent, or Firm* — Squire Sanders (US) LLP

(57) ABSTRACT

The present invention relates to a method, a terminal device and a network device for providing redundancy parameters for an automatic repeat request processing at a terminal device. The method includes selecting a redundancy strategy for an automatic repeat request processing at the terminal, and transmitting information indicating the selected redundancy strategy to the terminal device for generating redundancy parameters for the automatic repeat request processing at said terminal device. The information includes at least one of an index and a pointer to the selected at least one sequence.

27 Claims, 1 Drawing Sheet

(56) References Cited

OTHER PUBLICATIONS

ETSI TS 125 212 V5.5.0 (Jun. 2003) Technical Specification, "Universal Mobile Telecommunications System (UMTS); Multiplexing and Channel Coding (FDD) (3GPP TS 25.212 version 5.5.0 Release 5)," Jun. 2003, pp. 1-76, ETSI, France.

3GPP TR 25.896 V1.0.0 (Sep. 2003) Technical Report, "3rd Generation Partnership Project; Technical Specification Group Radio Access Network; Feasibility Study for Enhanced Uplink for UTRA FDD; (Release 6)," Sep. 2003, pp. 1-63, 3GPP, France.

CA Office Action for CA Application No. 2540611, dated Oct. 9, 2012.

* cited by examiner

REDUNDANCY STRATEGY SELECTION SCHEME

REFERENCE TO RELATED APPLICATION

This is a continuation application of U.S. patent application Ser. No. 10/732,745, filed on Dec. 11, 2003. The subject matter of the earlier filed application is hereby incorporated by reference.

BACKGROUND

1. Field

The present invention relates to a method, terminal device, and network device for providing redundancy parameters for an automatic repeat request processing at a terminal device of a communication network, particularly for uplink transmissions in a third generation mobile communication network.

2. Description of the Related Art

For wired links, reliability in data communications is traditionally obtained thanks to repetition. A packet is retransmitted when the previous attempt was unsuccessful. Such mechanism is called Automatic Repeat Request (ARQ). In the case of wireless transmissions, due to the poor quality of the link, packets should be protected against channel noise, fading due to mobility, and interference created by other users. Protection is mainly given by forward error coding (FEC), e.g. transmitting additional bits incorporated into the data packet. However, to provide the same quality as in a wired system, FEC overhead could lead to very inefficient transmissions. As a result, hybrid schemes, combining FEC and ARQ have been proposed. Hybrid ARQ (H-ARQ) has been defined as the joint use of ARQ and FEC. FEC provides correction of the most likely errors and thus avoids the conventional ARQ scheme to stall. On the other hand, ARQ could prevent FEC failure. Hence, the receiver may discard an erroneous transmission before decoding the new one. However, the decoder could benefit from previous attempts to improve the decoding performance of the current one. To achieve this, incremental redundancy schemes have been developed, where the first transmission is encoded with a high rate code, and thus low overhead but low protection, and the following transmissions simply consist of additional redundancy in order to decrease the code rate seen by the receiver.

Current enhancements for uplink packet data of Wideband Code Division Multiple Access (WCDMA) systems cover radio transmission of data from a mobile unit or mobile terminal, called User Equipment (UE) in third generation terminology, to a fixed station, called Node B in third generation terminology. Here, the case of erroneous reception of data packets is handled by Radio Link Control (RLC) signaling. This is disadvantageous in that a retransmission will require relatively large buffers and will introduce significant delays. One of the technologies under investigation in connection with enhanced uplink data is fast H-ARQ, where the packet retransmissions are handled at either physical layer or Media Access Control (MAC) layer and thus in principle at the Node B instead of the Radio Network Controller (RNC). This will significantly reduce the retransmission delay, allowing for more aggressive settings of the Block Error Rate (BLER) targets for the transmissions from the UE, which leads to a potential gain in uplink capacity through reduced signal-to-noise (Eb/NO) requirements.

During the standardization phase of High Speed Downlink Packet Access (HSDPA) for the Third Generation Partnership Project (3GPP) Release 5 specifications, the fast H-ARQ concept was introduced to the processing of the High-Speed Downlink Shared Channel (HS-DSCH), where the Node B has full control of the redundancy versions (RV) to be used for transmissions towards a given user, i.e., the standard simply specifies possible RVs but the Node B is free to use any RV and in any order. The Node B simply chooses the RV and signals the used RV to the UE on the High-Speed Shared Control Channel (HS-SCCH) just before the transmission of the data on the HS-DSCH using this RV. For the signaling of redundancy versions for HS-DSCH, three bits were assigned on the HS-SCCH, so that eight possible redundancy versions could be indicated.

Similarly, the simplest solution for RV selection for uplink transmissions would be if this selection was totally left to the UE. This may, however, cause problems in cases where different Node Bs have different capabilities which the UE should take into account. Moreover, the network may be operated in different ways, e.g. with high or low BLER target, which each may have different optimum RV strategies, such that only sub-optimal network performance is achieved. Further details regarding different redundancy versions and corresponding processing schemes can be gathered from the 3GPP specification TS 25.212.

Another problem in the uplink direction is that signaling from the UE to the Node B will introduce overhead from all UEs operating in the enhanced DCH mode. It is quite important that the RV coding information is received properly since an erroneous reception of these values will cause an erroneous reception of the data packet itself by introduction of erroneous puncturing patterns.

SUMMARY

It is therefore an object of the present invention to provide an improved redundancy strategy selection scheme, by means of which a signaling load can be reduced while increasing flexibility in the selection.

This object is achieved by a method including selecting a redundancy strategy for an automatic repeat request processing at a terminal device, and transmitting information indicating the selected redundancy strategy to the terminal device for generating a sequence of redundancy parameters for the automatic repeat request processing at the terminal device. The information includes at least one of an index and a pointer to the selected redundancy strategy.

Furthermore, the above object is achieved by a terminal device including receiving means for receiving information indicating a redundancy strategy for an automatic repeat request processing at a terminal, and parameter generating means, operably connected to the receiving means, for generating a sequence of redundancy parameters for the automatic repeat request function in response to receipt of the information to apply the redundancy strategy to the automatic repeat request function. The information includes at least one of an index and a pointer to the redundancy strategy.

Furthermore, the above object is achieved by a terminal device including a receiver configured to receive redundancy strategy for an automatic repeat request processing at a terminal, and a parameter generating unit, operably connected to the receiver, configured to generate a sequence of redundancy parameters for the automatic repeat request function in response to the receipt of the information to apply a redundancy strategy to the automatic repeat request function. The information includes at least one of an index and a pointer to the redundancy strategy.

Furthermore, the above object is achieved by a network device including selecting means for selecting a redundancy strategy for an automatic repeat request processing at a terminal device, and generating means, operably connected to the selecting means, for generating information indicating the selected redundancy strategy. The network device further includes transmitting means, operably connected to the selecting means, for transmitting the information to the terminal device to provide a communication link to the terminal device. The information includes at least one of an index and a pointer to the selected redundancy strategy.

Finally, the above object is achieved by a network device including a selecting unit configured to select a redundancy strategy for an automatic repeat request processing at a terminal device, and a generator, operably connected to the selecting unit, configured to generate information indicating the selected redundancy strategy. The network device further includes a transmitter, operably connected to the selecting unit, configured to transmit the information to the terminal device to provide a communication link to the terminal device. The information includes at least one of an index and a pointer to the selected redundancy strategy.

Accordingly, a network operator is able to select the redundancy strategy to be used by the terminal devices simply by selecting a predetermined strategy information and signaling this information to the terminal device. Thereby, the terminal devices do not independently select their own strategies. The proposed selection scheme requires less signaling between the network and the terminal device, as only information indicating the strategy or sequence can be transmitted from the network to the terminal device. Furthermore, if the Node B and the terminal device both know which transmission strategies or sequences are available, then signaling overhead can be further reduced by simply signaling an information indicating the strategy but not each parameter of the sequence.

In particular, the strategy information may be an index or a pointer to the selected at least one predetermined sequence. Thereby, the signaling amount merely depends on the number of sequences within the set of predetermined sequences, because the strategy information only needs to specify the index or pointer pointing to the selected parameter sequence.

The transmitting step may be performed by using a higher layer signaling. As an example, the higher layer signaling may be a Radio Resource Control signaling. The use of a higher layer signaling provides the advantage that the lower layer signaling is freed from this additional signaling which reduces transmission delay.

Furthermore, the transmission step may be performed at the beginning of the connection. Thereby, the redundancy strategy or sequence of redundancy parameters to be used for the specific connection is made available to the terminal device at an early point in time.

As an alternative, the set of predetermined sequences or strategies may be a predefined fixed set. Thereby, both the terminal device and the network know in advance which redundancy strategies are available, such that a signaling of the specific parameter sequences for each strategy is not required.

The redundancy parameters may comprise a first parameter defining a self-decodable redundancy version, and a second parameter defining bits which are to be punctured. As an example, the set of predetermined sequences may comprise sequences relating to at least one of a chase combining strategy, a partial incremental redundancy strategy, and a full incremental redundancy strategy. By providing these different strategies, a good adaptation of the repeat request scheme to different network situations or characteristics can be obtained.

The transmission may be performed by broadcasting the strategy information to all terminal devices located within a predetermined area. Thereby, all terminal devices within the specific area are controlled to use the same redundancy strategy, so that a good adaptation to a specific capability of this network area can be assured.

The automatic repeat request processing may be performed for data transmission on a dedicated transport channel, e.g. an enhanced uplink dedicated channel of a third generation mobile communication system.

The terminal device may comprise storing means for storing the set of sequences of redundancy parameters which may have been signaled from the network or which may have been pre-configured due to the respective specifications. Similarly, the network device may comprise storing means for storing the set of sequences of the redundancy parameters, from which a specific sequence can be selected by the selecting means. The redundancy parameters used at the terminal device may be signaled to the network by using an outband signaling, which does not affect the dedicated data transmission channel. The amount of outband information may depend on the selected sequence of redundancy parameters. Hence, the terminal device may be configured to set the amount of outband signaling in response to the received strategy information. Correspondingly, the network device may comprise receiving means for receiving the notification about used redundancy parameters via the outband signaling channel.

Further advantageous developments are defined in the dependent claims.

BRIEF DESCRIPTION OF THE DRAWINGS

The invention will now be described based on embodiments with reference to the accompanying drawings, in which.

DETAILED DESCRIPTION

Figure 1:
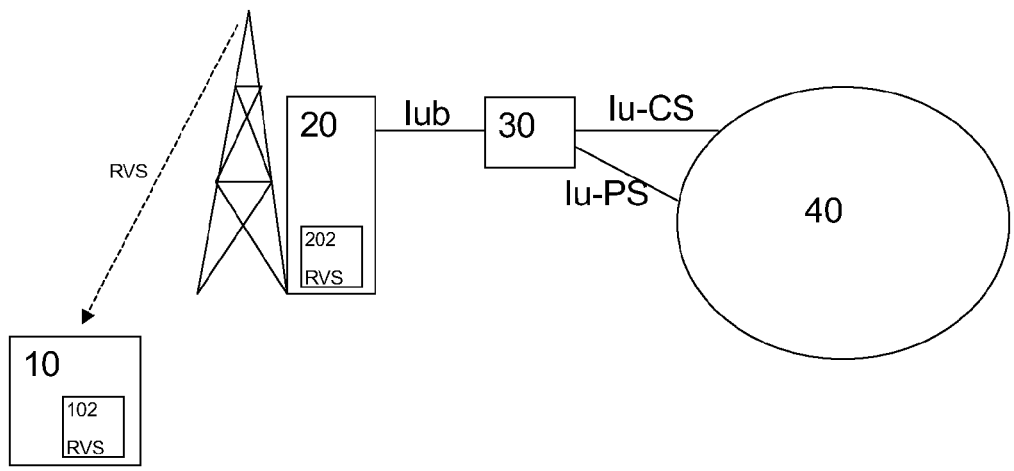
FIG. 1 shows a schematic network architecture with a terminal device and a Node B device according to the preferred embodiments.

In the following, the embodiments will be described on the basis of a third generation WCDMA radio access network architecture as shown in FIG. 1.

Third generation mobile systems like the Universal Mobile Telecommunications System (UMTS) are designed to provide a wide range of services and applications to mobile users. The support of higher user bit rates is most likely the best known feature of UMTS. A mobile user can get access to UMTS through the WCDMA-based UMTS Terrestrial Radio Access Network (UTRAN). According to FIG. 1, a base station or a Node B 20 terminates the L1 air interface and forwards the uplink traffic from a terminal device or UE 10 to an RNC 30. The RNC 30 is responsible for radio resource management (RRM) and controls all radio resources within its part of the UTRAN. The RNC 30 is the key interface partner for the UE 10 and constitutes the interface entity towards a core network 40, e.g. via a UMTS Mobile Switching Center or a Serving GPRS (General Packet Radio Services) Support Node (SGSN) (both not shown in FIG. 1). Within the UTRAN, Asynchronous Transfer Mode (ATM) is used as the main transport technology for terrestrial interconnection of the UTRAN nodes, i.e. RNCs and Node Bs.

In the simplified sample architecture shown in FIG. 1, the UE 10 is connected via the air interface to the Node B 20. Of course, several Node Bs can be provided which are connected via the RNC 30 or other RNCs (not shown). The Node Bs are connected via respective Iub interfaces to the RNCs. The Node Bs are logical nodes responsible for radio transmission and reception in one or more cells to/from the UE 10 and terminate the Iub interface towards the respective RNC. The RNCs provide connections to the core network 40 for circuit-switched (CS) traffic via a Iu-CS interface and for packet-switched (PS) traffic via a Iu-PS interface. It should be noted that in a typical case many Node Bs are connected to the same RNC.

According to the embodiments, a set of at least two RV strategies which define predetermined sequences of RV parameters is provided or selected at the Node B 20. The set of RV strategies may be stored in a memory of the Node B 20 or may be derived by the Node B 20 from a network database or the like. When a connection to the UE 10 is set up, the Node B 20 signals a strategy information indicating at least one selected RV strategy to the UE 10. Having received the strategy information, the UE 10 is in position to derive the corresponding sequence of RV parameters. This may be achieved by providing storing means for storing the parameter sequences corresponding to the set of strategies at a respective memory provided at a UE 10. The memory may be pre-configured based on predetermined network specifications or may be loaded with the parameter sequence(s) in advance by corresponding signaling information received from the Node B 20. As an alternative, the Node B 20 may be configured to select a predetermined parameter sequence and to transmit a strategy information directly comprising the selected parameter sequence.

Although the RV strategy is specified by the network, the UE 10 may send with each data packet also the actually used RV parameters. This can be advantageous if the network has missed some uplink transmission and therefore does not know which version of a packet (i.e., first, second, third, etc. version) the UE 10 is actually transmitting. The RV parameters may be sent by using an outband signaling which is to be understood here as a kind of separate transmission, i.e. not inside the data packet as a header. The RV parameters are needed to be able to decode received data packets. Therefore, the RV parameters cannot be sent "inband", since successful decoding is required to read the packet including the "inband" header and the RV parameters are needed for this decoding. The outband signaling can be transmitted using a separately channel coded header time-multiplexed with the data or using a different code channel or physical channel. Once the RV strategy is known to the UE 10, the number of bits needed in the uplink direction to indicate the used RV parameters can be derived and can thus be made dependent on the strategy selected by the network.

In the following, the embodiments of the present invention are described in more detail using redundancy versions as specified for HSDPA in the downlink direction. The following table indicates eight possible RVs indexed by a sequence of RV values $X_{rv}$ and specified for QPSK in the 3GPP specification TS 25.212. The parameter s=1 defines self-decodable redundancy versions, where systematic bits have higher priority than parity bits (i.e. puncturing is done primarily on parity bits), and the parameter r defines which bits are to be punctured.

| $X_{rv}$ (value) | s | r |
|---|---|---|
| 0 | 1 | 0 |
| 1 | 0 | 0 |
| 2 | 1 | 1 |
| 3 | 0 | 1 |
| 4 | 1 | 2 |
| 5 | 0 | 2 |
| 6 | 1 | 3 |
| 7 | 0 | 3 |

Possible RV strategies derived from the above RV parameter values may comprise, for example, the following three different strategies:

Chase combining (CC) where exactly the same packet is retransmitted in case of an erroneous reception of a packet. All packets can be received individually, but also combined during reception to reduce the influence of noise power;

Partial Incremental Redundancy (PIR) where all packets are self-decodable (or prioritizing systematic bits according to the 3GPP terminology), but instead of transmitting exactly the same packet, a different puncturing pattern is used, trading some of the combining gain for coding gain. Since all the transmitted data packets are self-decodable, the full potential of increased coding cannot be utilized; and Full Incremental Redundancy (FIR) where the main target of retransmission is to reach the maximum potential of coding gain at the cost of combining gain. This is an efficient strategy from a performance point of view, but if the first transmission or reception has failed completely, the retransmission will experience very poor performance relative to CC or PIR.

It should be noted, however, that these strategies are only examples and other suitable strategies may be applied in connection with the present invention.

The sequence of RVs for each strategy could be selected as follows using the index numbering of the above table:

CC: 0,0,0,0,0,0,0,0
PIR: 0,2,4,6,0,2,4,6
FIR: 0,1,2,3,4,5,6,7

The above strategies or sequences of RV parameters can be interpreted as follows. The first transmission of a given block should use parameter combination $X_{rv}$=0 in all strategies specified above. For CC, all the transmissions should be the same and would thus use $X_{rv}$=0. For PIR, the second transmission should use the parameter combination $X_{rv}$=2, the third transmission $X_{rv}$=4, etc., i.e., all transmissions are self-decodable, as s=1. Finally, for FIR, all parameter combinations RV are used in sequence, $X_{rv}$=0 for the first transmission, $X_{rv}$=1 for the second transmission etc. If more than eight transmissions or retransmissions are needed, then the sequence is repeated again.

According to the first embodiment, the RV strategies can be numbered, e.g., CC could have strategy number "0", PIR could have the strategy number "1", and FIR could have the strategy number "2". Of course, also other strategies could be specified and correspondingly numbered. At the beginning of a connection, the RNC 30 may signal to the UE 10 the RV strategy to be used for the connection, using RRC signaling. Thus, if there are for example four different strategies specified, two bits are needed to signal the strategy using a binary information pattern.

The RV parameters used in the uplink direction can then be signaled outband by the UE 10, i.e., using an own signaling channel protected separately from the data. By specifying the individual RV strategies, the number of bits required for transmitting the RV parameters and thus the number of uplink outband information can be made dependent on the selected RV strategy. For instance, if the CC strategy is selected, no signaling is required for the RV parameters, as the RV combination is known for the whole sequence. For PIR, only two bits are needed, as there are only four possible RV parameter combinations. Thus, the number of outband information bits can be reduced if the RV parameters or parameter combination is signaled from the Node B 20 to the UE 10.

According to the second embodiment, the sequence or RV parameters to be used by the UE 10 is signaled to the UE 10 from the RNC 30 at the beginning or at set-up of the connection by using RRC signaling. The network may select a predetermined sequence to be used for this connection, e.g., a sequence of {0,1,2,4}. This second preferred embodiment provides the advantage that the network or network operator can define any sequence of RV parameters suitable for a specific application or network environment. However, in this case more bits have to be signaled. In the above example of eight different RV parameter combinations, three bits are required for each RV combination. Thus, if four RV combinations are specified for the sequence, then twelve bits are needed in total to specify the sequence.

According to the third embodiment, the RV sequences can be specified in the network specification so as to be pre-configurable at the Node B 20 and the UE 10. The selected RV strategy can than be cell- or network-specific and can be broadcast on a common channel. The RV strategy is then the same for all UEs in the specific cell or network. If the reason for the use of a certain RV strategy is the Node B capability, for example, and therefore all UEs in the concerned cell should use the same RV strategy, then signaling capacity can be saved if the RV strategy is broadcast to all UEs at the same time.

Figure 2:
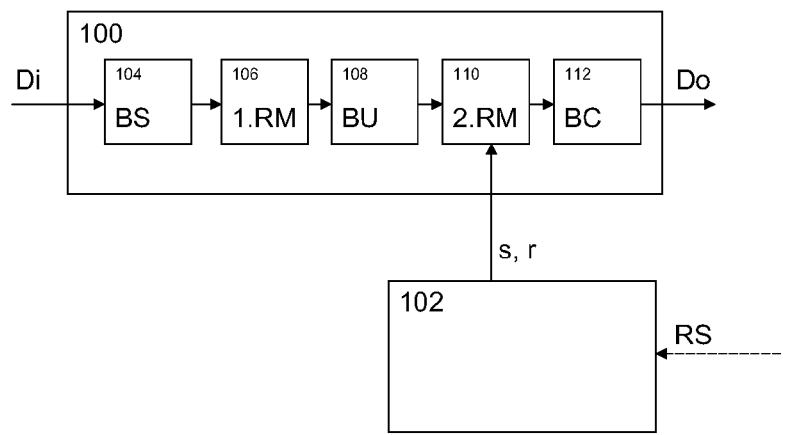
FIG. 2 shows a schematic block diagram of a H-ARQ functionality as provided in a terminal device according to the preferred embodiments.

FIG. 2 shows a schematic block diagram of a repeat request functionality 100 provided at the UE 10 with an adaptable or controllable RV parameter generating unit 102 which can be controlled based on the strategy information RS received from the network.

The repeat request functionality 100 can be used for the enhanced uplink DCH (E-DCH) channel or any other physical or transport channel and is configured to match the number of bits of input data Di received from a preceding channel coder to the total number of bits of output data Do. The repeat request functionality 100 is controlled, for instance, by the RV parameters s and r indicated in the above table. The exact set of bits at the output of the repeat request functionality 100 depends on the number of input bits, the number of output bits, and the RV parameters.

The repeat request functionality 100 comprises two rate-matching stages 106, 110 and a virtual buffer 108. Furthermore, it comprises a bit separation function 104, where systematic bits, first parity bits and second parity bits in the bit sequence input to the first rate matching block 106 are separated into three sequences. Additionally, a bit collection function 112 provides an inverse function to the bit separation function 104. The bit separation function 112 is transparent for convolutionally encoded transport channels and for turbo encoded transport channels with repetition. Further details regarding the above bit separation function 104, first and second rate matching function 106, virtual buffer unit 108, and bit collection function 112 can be gathered from the 3 GPP specification TS 25.212.

At the second rate matching stage 110 a rate matching rule is applied based on the values of the RV parameters s and r, as specified in the above 3 GPP specification.

According to the first to third embodiments, the RV parameter generating function 102 receives the strategy information defining the specific parameter sequence from the network and generates corresponding RV parameter values e.g. as indicated in the above table. This generation may be based on a look-up operation, if the sequences are pre-configured and thus stored in the UE 10. This may be the case in the first and third embodiment. In the second embodiment, the parameter generation function 102 may be configured to store the RV sequence signaled from the network in the memory and to successively apply the corresponding RV parameters to the second rate matching function 110.

The above embodiments can be used to define several strategies for combining, which use different sequences of RV parameter combinations, e.g. self-decodable and/or non-self-decodable. These strategies are either fixed, i.e. defined in the respective specifications, or configurable. The network selects one of the strategies and tells it to the UE 10 either at connection setup or broadcasts it to several UEs. Based on the strategy, different signaling principles can be used, e.g. outband signaling with e.g. no RV bits of the strategy CC. Thus, a set of RV strategies can be defined and the network, e.g. RNC 30 or Node B 20, can easily signal the selected strategy to the UE 10. Thus a simple solution of having different RV strategies and the associated signaling can be provided to inform the UE 10 about the RV strategy it should use. The network can decide which strategies being used. The decision can be based either on the Node B capabilities or on performance issues or any other reasons the network may have. A concept of having retransmission strategies defined in semi-static manner in the UE 10 can thus be provided, such that for instance a high-end Node B can tell the connected UEs to use Incremental Redundancy (IR) for retransmissions, while a low-end Node B with limited buffer capabilities can tell the connected UEs to use PIR or even CC for retransmissions.

It is noted, that the present invention is not restricted to the above embodiments but can be used in any communication network with any automatic repeat request processing scheme where a terminal device uses a redundancy strategy for ARQ processing. Moreover, any kind of strategy defining a predetermined sequence of redundancy parameters can be signaled. It should be noted in particular that the above description of the two-stage rate matching scheme is only used as an example here. The actual scheme to be used on enhanced uplink DCH may be different, e.g., using only one stage. Also, the RV parameters may be different from those used for HSDPA. For instance, only one of the above s or r parameters could be used. However, the scheme supports at least two redundancy versions and the sequence of RVs is selectable by the network. In minimum, there could be only two RVs specified, e.g., 0 and 1 (or 2) in the earlier table. The possible strategies/sequences could then be, e.g., {0,0,0,0} and {0,1,0,1}. The network would select one of these strategies and signal that to the UE using e.g. downlink RRC signaling. The UE would then use RVs according to the selected strategy. For instance, if the second sequence {0,1,0,1} is selected by the network, then the UE would use RV=0 for the first transmission, RV=1 for the first retransmission of that block, RV=0 for the second retransmission of that block, etc. The preferred embodiments may thus vary within the scope of the attached claims.

We claim:

1. A method, comprising:
   selecting a redundancy strategy for an automatic repeat request processing at a terminal device; and
   transmitting information indicating the selected redundancy strategy to the terminal device for generating a sequence of redundancy parameters for the automatic repeat request processing at the terminal device,
   wherein the information comprises at least one of an index and a pointer to the selected redundancy strategy.

2. The method according to claim 1, wherein the transmitting the information comprises transmitting using a higher layer signaling.

3. The method according to claim 2, wherein the transmitting the information comprises transmitting using a radio resource control signaling.

4. The method according to claim 2, further comprising:
   using an outband signaling for notifying about the sequence of redundancy parameters used from the selected redundancy strategy.

5. The method according to claim 4, wherein the using comprises using the outband signaling in an amount based on the selected redundancy strategy.

6. The method according to claim 1, wherein the transmitting the information is performed at a beginning of a connection.

7. The method according to claim 1, wherein the transmitting the information comprises transmitting the information comprising the sequence of redundancy parameters.

8. The method according to claim 1, wherein the transmitting the information comprises broadcasting the information to substantially all terminal devices located within a predetermined area.

9. The method according to claim 6, wherein the transmitting the information comprises broadcasting the information to all terminal devices located within a predetermined area.

10. The method according to claim 1, wherein the transmitting the information is performed via a wireless communication link.

11. The method according to claim 1, further comprising:
    performing the automatic repeat request processing for a data transmission on an enhanced uplink dedicated channel.

12. The method according to claim 1, wherein the transmitting the information comprises transmitting strategy information indicating the selected redundancy strategy to the terminal device.

13. A terminal device, comprising:
    receiving means for receiving information indicating a redundancy strategy for an automatic repeat request processing at a terminal; and
    parameter generating means, operably connected to the receiving means, for generating a sequence of redundancy parameters for the automatic repeat request function in response to receipt of the information to apply the redundancy strategy to the automatic repeat request function,
    wherein the information comprises at least one of an index and a pointer to the redundancy strategy.

14. A terminal device, comprising:
    a receiver configured to receive redundancy strategy for an automatic repeat request processing at a terminal; and
    a parameter generating unit, operably connected to the receiver, configured to generate a sequence of redundancy parameters for the automatic repeat request function in response to the receipt of the information to apply a redundancy strategy to the automatic repeat request function,
    wherein the information comprises at least one of an index and a pointer to the redundancy strategy.

15. The terminal device according to claim 14, further comprising:
    a mobile terminal of a cellular communication network, operably connected to the receiver.

16. The terminal device according to claim 14, wherein the receiver is configured to receive the information via radio resource control signaling.

17. The terminal device according to claim 14, wherein the terminal device is configured to notify about the sequence of redundancy parameters used from the redundancy strategy using an outband signaling.

18. The terminal device according to claim 14, wherein the terminal device is configured to set an amount of the outband signaling in response to the received information.

19. The terminal device according to claim 14, wherein the parameter generating unit is configured to generate a first parameter defining a self-decodable redundancy version and a second parameter defining bits which are to be punctured.

20. The terminal device according to claim 14, further comprising:
    a storing unit, operably connected to the receiver, configured to store a set of sequences of redundancy parameters,
    wherein the information comprises at least one of a pointer and an index to the stored set of sequences.

21. A network device, comprising:
    selecting means for selecting a redundancy strategy for an automatic repeat request processing at a terminal device;
    generating means, operably connected to the selecting means, for generating information indicating the selected redundancy strategy; and
    transmitting means, operably connected to the selecting means, for transmitting the information to the terminal device to provide a communication link to the terminal device,
    wherein the information comprises at least one of an index and a pointer to the selected redundancy strategy.

22. A network device, comprising:
    a selecting unit configured to select a redundancy strategy for an automatic repeat request processing at a terminal device;
    a generator, operably connected to the selecting unit, configured to generate information indicating the selected redundancy strategy; and
    a transmitter, operably connected to the selecting unit, configured to transmit the information to the terminal device to provide a communication link to the terminal device,
    wherein the information comprises at least one of an index and a pointer to the selected redundancy strategy.

23. The network device according to claim 22, further comprising:
    a receiver, operably connected to the selecting unit, configured to receive a notification about used redundancy parameters via an outband signaling channel.

24. The network device according to claim 22, wherein the transmitter is configured to transmit the information in a broadband channel covering a predetermined area.

25. The network device according to claim 22, further comprising:
- a storing unit, operably connected to the selecting unit, configured to store a set of sequences of the redundancy parameters.

26. The network device according to claim 22, wherein the network device comprises at least one of a base station device and a radio network controller device.

27. The network device according to claim 22, wherein the generator is configured to generate strategy information indicating the selected redundancy strategy.

* * * * *

UNITED STATES PATENT AND TRADEMARK OFFICE
CERTIFICATE OF CORRECTION

| | | |
|---|---|---|
| PATENT NO. | : 8,578,231 B2 | Page 1 of 1 |
| APPLICATION NO. | : 13/044015 | |
| DATED | : November 5, 2013 | |
| INVENTOR(S) | : Esa Malkamäki et al. | |

It is certified that error appears in the above-identified patent and that said Letters Patent is hereby corrected as shown below:

In the claims:

Claim 1, Column 9, Line 63

Please change "a receiver configured to receive redundancy strategy for an" to

--a receiver configured to receive redundancy strategy information for an--

Signed and Sealed this
Tenth Day of May, 2016

Michelle K. Lee
*Director of the United States Patent and Trademark Office*